(12) United States Patent
Ditzik

(10) Patent No.: US 6,520,554 B2
(45) Date of Patent: Feb. 18, 2003

(54) YARD SWEEPINGS COLLECTION DEVICE

(76) Inventor: Betty J. Ditzik, 5424 Pineview, Ypsilanti, MI (US) 48197

( * ) Notice: Subject to any disclaimer, the term of this patent is extended or adjusted under 35 U.S.C. 154(b) by 0 days.

(21) Appl. No.: 09/835,868

(22) Filed: Apr. 16, 2001

(65) Prior Publication Data

US 2002/0038956 A1 Apr. 4, 2002

Related U.S. Application Data

(60) Provisional application No. 60/197,252, filed on Apr. 14, 2000.

(51) Int. Cl.$^7$ ................................................ A47L 13/52
(52) U.S. Cl. ...................... 294/1.1; 294/1.4; 15/257.1; 248/100
(58) Field of Search .................. 294/1.1, 1.4, 1.5, 294/55, 61; 15/257.1, 257.9; 248/99, 100

(56) References Cited

U.S. PATENT DOCUMENTS

| | | | | | |
|---|---|---|---|---|---|
| 224,318 | A | * | 2/1880 | Yerdon ........................ 248/100 |
| 1,274,008 | A | * | 7/1918 | Conwell ........................ 294/61 |
| 1,325,292 | A | * | 12/1919 | Hood ........................ 15/104.165 |
| 3,121,248 | A | * | 2/1964 | Ferguson | |
| 3,733,099 | A | * | 5/1973 | Szita ........................ 294/1.4 |
| 3,754,785 | A | * | 8/1973 | Anderson ........................ 248/99 |
| 4,052,764 | A | * | 10/1977 | Groff ........................ 15/257.9 |
| 4,146,259 | A | * | 3/1979 | Schultz | |
| 4,149,745 | A | * | 4/1979 | Willis ........................ 15/257.1 |
| 4,349,224 | A | * | 9/1982 | Shiozaki ........................ 294/1.4 |
| 4,815,866 | A | * | 3/1989 | Martone ........................ 141/390 |
| 6,052,860 | A | * | 4/2000 | Coxsey ........................ 141/316 |

* cited by examiner

Primary Examiner—Dean J. Kramer
(74) Attorney, Agent, or Firm—James M. Deimen

(57) ABSTRACT

A new yard sweepings collection device comprises a triangular frame having one side frame member extending well beyond the triangular frame to form a convenient handle. A garbage or yard and garden plastic bag opening is wrapped around the triangular frame and secured by a plurality of nail or spike ends extending outwardly from the frame. Plastic bags having openings larger than the triangular opening are accommodated by gathering the excess plastic at the top of the frame and impaling the excess on the nail ends at the top of the frame. The plurality of nail ends on each side member of the frame accommodates plastic bags with openings somewhat smaller than the frame opening. Adjacent the nails and attached to the frame are guards to reduce the likelihood of inadvertently brushing against the nails. In addition, a runner may be attached to the bottom frame member to support and protect the plastic bag against abrasion and tearing from objects on the ground.

5 Claims, 3 Drawing Sheets

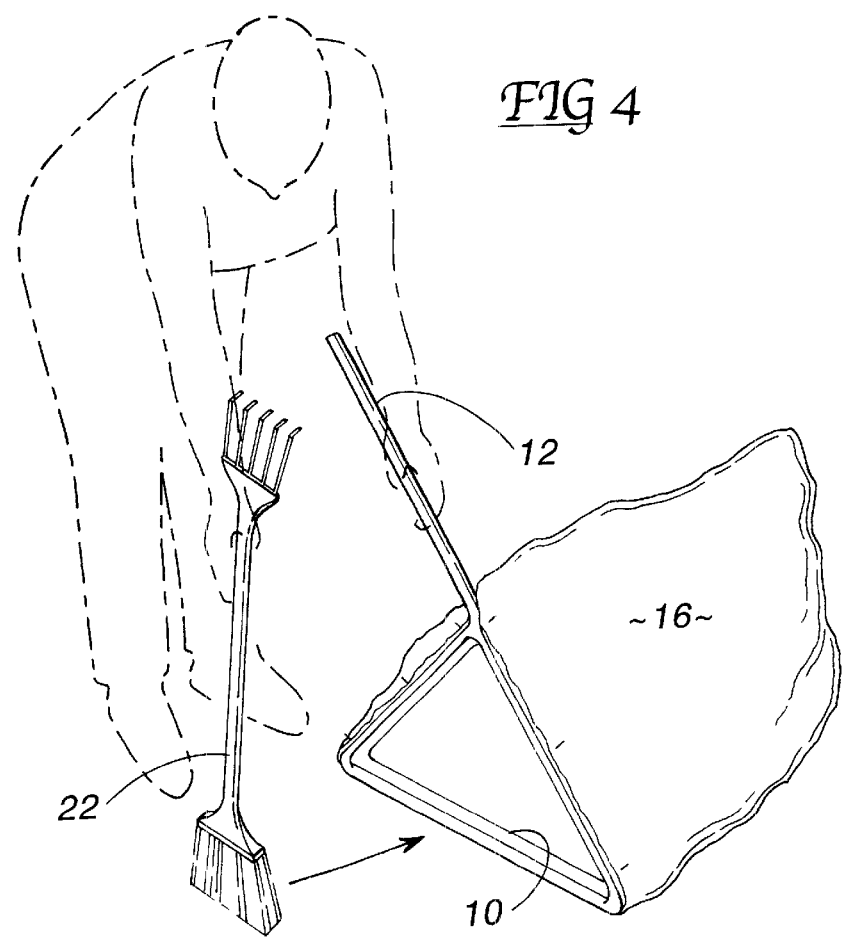
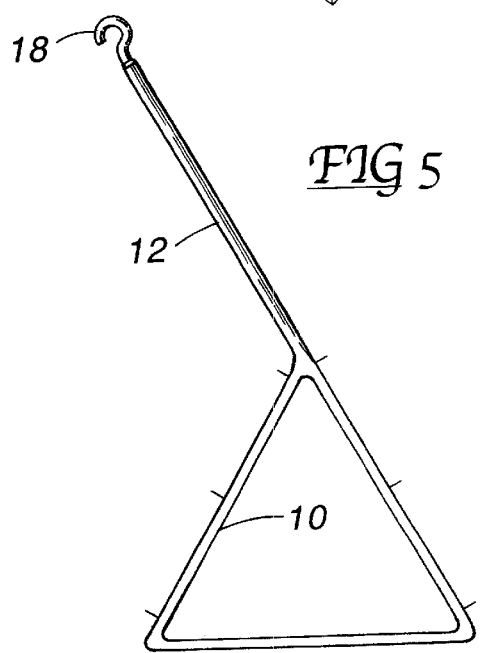
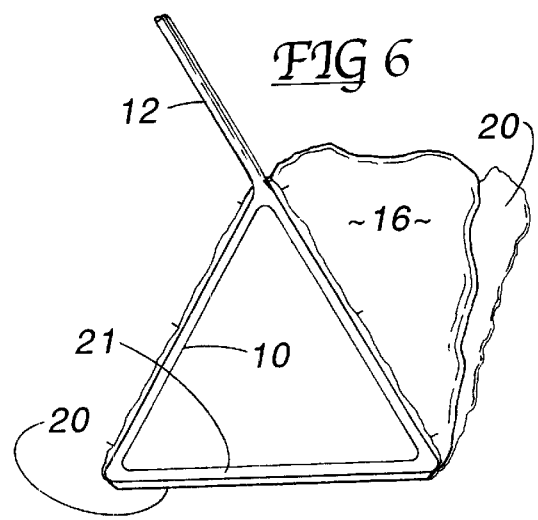

YARD SWEEPINGS COLLECTION DEVICE

This application claims the benefit of provisional patent application No. 60/197,252, filed Apr. 14, 2000.

BACKGROUND OF THE INVENTION

The field of the invention pertains to devices for filling and containing yard debris such as leaves, twigs, paper scraps and animal droppings and, in particular, devices for conveniently holding open large plastic garbage bags so that such items can be conveniently swept or raked into the bags.

U.S. Pat. No. 4,196,928 discloses a triangular collection device for holding a bag and an integral rake or broom to sweep debris into the bag. U.S. Pat. No. 4,705,310 also discloses a triangular collection device for holding a bag. Both of these devices have a separate handle extending from the apex of the triangle remote from the bottom element of the triangle and perpendicular thereto. U.S. Pat. No. 4,048,691 discloses a triangular frame wherein the separate handle includes means to retain the bag to the frame.

U.S. Pat. No. 3,733,099 discloses a triangular frame having an offset handle extending therefrom and a plurality of clips for retaining the bag to the frame. A collapsible frame is disclosed in U.S. Pat. No. 4,159,139 wherein the bag opening is stretched to retain the bag on the frame.

U.S. Pat. No. 4,482,116 discloses a foldable frame for holding a bag mouth open. One side of the frame is telescopeable to provide adjustment for the size of the bag mouth.

SUMMARY OF THE INVENTION

The new yard sweepings collection device comprises a triangular frame having one side frame member extend well beyond the triangular frame to form a convenient handle. A garbage or yard and garden plastic bag has the mouth thereof inserted through the triangular frame. The edge of the plastic bag opening is wrapped around the triangular frame and secured by a plurality of nail or spike ends extending outwardly from the frame.

Preferably, the plastic bag has an opening larger than the triangular frame. The excess plastic may be gathered at the top of the frame and impaled on the nail ends at the top of the frame. The frame includes several nails on each side such that bags with openings somewhat smaller than the frame opening can be used.

Adjacent the nails and attached to the frame are guards to reduce the likelihood of inadvertently brushing against the nails.

BRIEF DESCRIPTION OF THE DRAWINGS

FIG. 4 illustrates the collection device and bag in use;

FIG. 5 is a front view of the collection device with hanging hook attached;

FIG. 6 is a front view of the collection device with a plastic runner attached;

DESCRIPTION OF THE PREFERRED EMBODIMENTS

Figure 1:
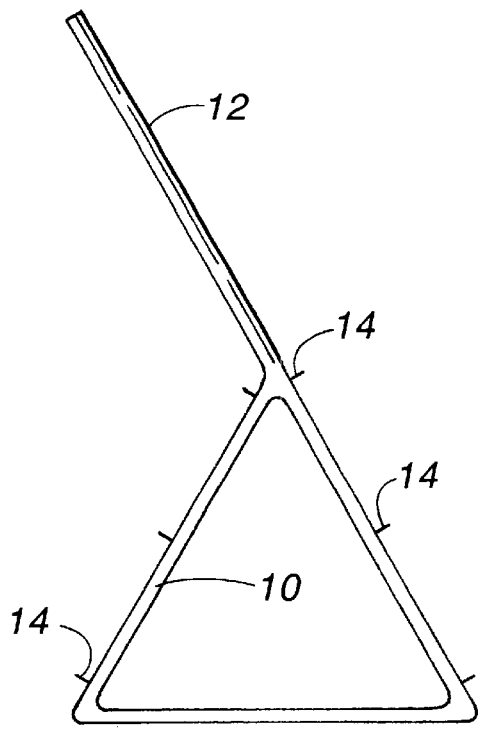
FIG. 1 is a front view of the new yard sweepings collection device.
Figure 2:
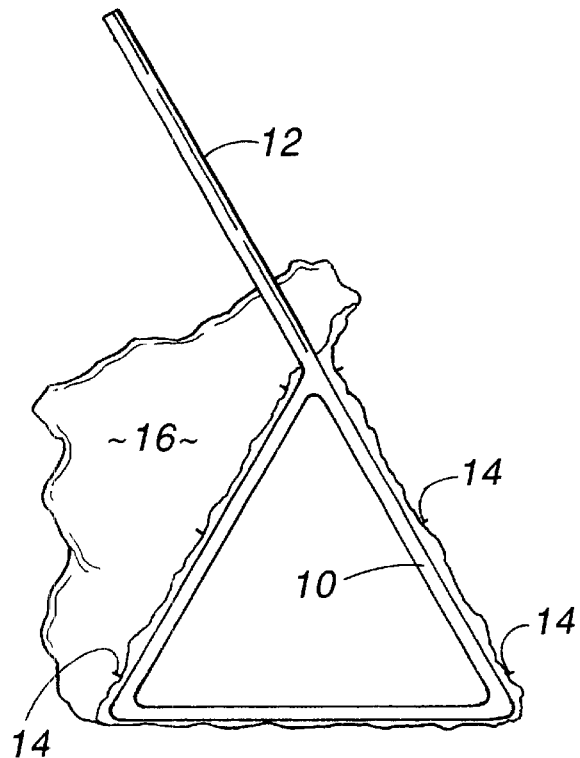
FIG. 2 illustrates a bag attached to the collection device in front view.
Figure 3:
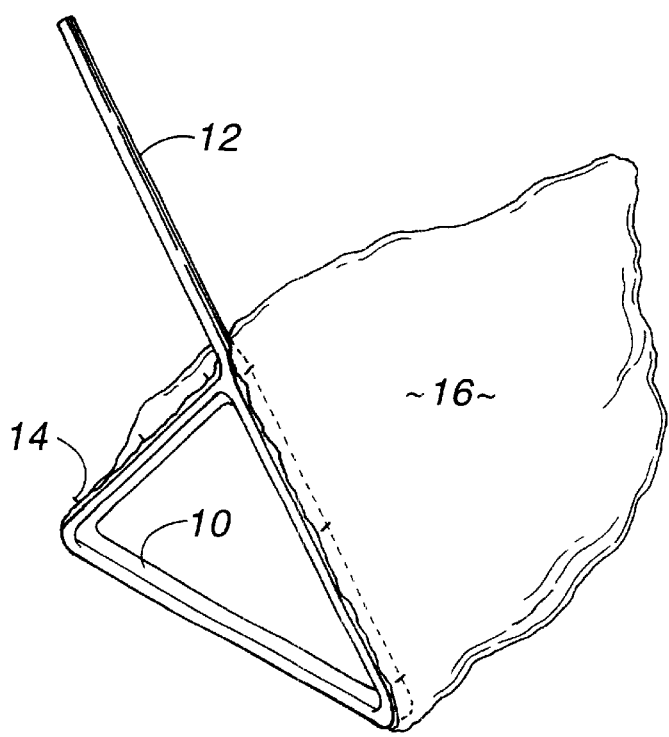
FIG. 3 illustrates the collection device and bag in perspective view.

As shown in FIGS. 1 and 2 the frame 10 is triangular with one extended side 12 that forms a handle. Nails or spikes 14 stick out from the frame 10. A trash bag 16 may be attached to the nails 14 on the outside of the frame as shown or drawn through the frame and wrapped over onto the nails. The nails or spikes 14 are only sharp enough to easily pierce the plastic bag material. FIGS. 3 and 4 depict a frame for use with the left hand, the right hand being used to sweep in debris with a rake or broom. By merely placing the bag to the other side of the frame, the frame and bag are suited for use with the right hand.

Although described above in terms of a wooden frame 10 with spikes or nails 14, the frame may be constructed of aluminum, plastic or any other rigid lightweight material. Other means for piercing or otherwise attaching the bag to the frame may be used with aluminum or plastic as being more suitable than spikes or nails 14.

As options for use with the frame are a hook 18 at the upper end of the handle 12 to hang the device on a wall as shown in FIG. 5 and a tough flexible plastic runner 20 attached to the bottom element 21 of the frame 10 and extending there behind to support and protect the bag 16 there above from tearing on rough or sharp surfaces as shown in FIG. 6.

Figure 7:
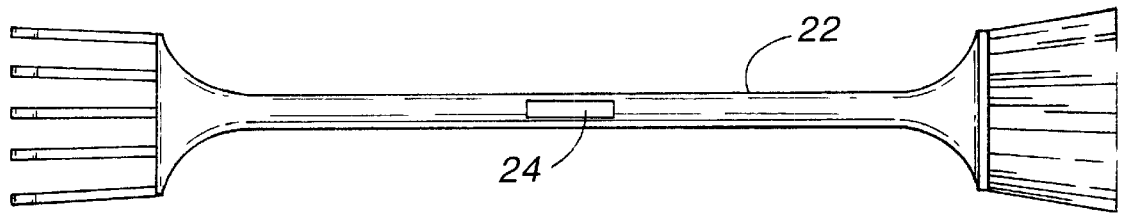
FIG. 7 illustrates a hand rake and broom tool for use with the collection device.

A hand rake 22 as shown in FIG. 4 and FIG. 7 can be included with a broom at one end and a small rake at the other end. A clip 24 at the center removably attaches the hand rake 22 to the frame 10. With the bottom element 21 rounded or otherwise formed to smooth the entrance of debris in the manner of a dust pan, the debris can be easily raked or swept into the bag 16.

Figure 8:
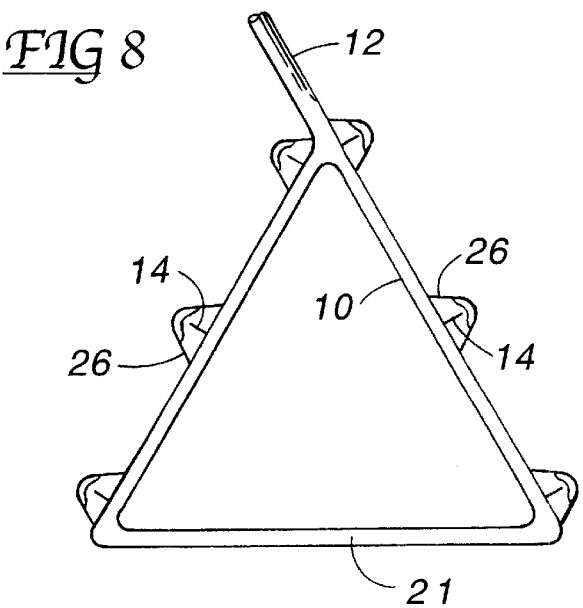
FIG. 8 illustrates in front view guards on the collection device.
Figure 9:
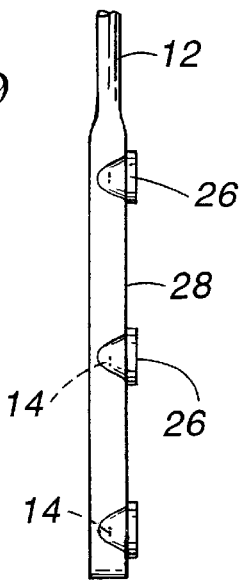
FIG. 9 illustrates in side view guards on the collection device.

As an option, curved guards 26 are attached to the back side 28 of the frame 10 adjacent the nail 14 locations as shown in FIGS. 8 and 9. The guards 26 reduce the likelihood that the nails 14 will be inadvertently contacted by the user.

What is claimed is:

1. A yard sweepings collection device comprising an open substantially triangular frame, said frame having one element forming a bottom of the frame and two elements forming the sides of the frame with one of the side elements being extended beyond the triangular frame to form a handle, said side elements having backsides, a plurality of bag attachment means extending from the triangular frame, said bag attachment means so located as to provide attachment of bags having a range of bag opening sizes, and at least one guard attached to each of the backsides of the two side elements adjacent the bag attachment means.

2. The yard sweeping device of claim 1 including a plurality of guards attached to each of the backsides of the two side elements adjacent the bag attachment means.

3. A yard sweepings collection device comprising an open substantially triangular frame, said frame having one element forming a bottom of the frame and two elements forming the sides of the frame with one of the side elements being extended beyond the triangular frame to form a handle, said elements having backsides, a plurality of bag attachment means extending from the triangular frame, said bag attachment means so located as to provide attachment of bags having a range of bag opening sizes, a flexible runner extending backwardly from the bottom element to be generally underneath any bag attached to the device, and at least one guard attached to each of the backsides of the two side elements adjacent the bag attachment means.

4. A yard sweepings collection device comprising an open substantially triangular frame, said frame having one element forming a bottom of the frame and two elements forming the sides of the frame with one of the side elements being extended beyond the triangular frame to form a handle, said side elements having backsides, a plurality of separate bag attachments, and at least one rigid curved guard attached to the backside of each of the side elements, said guards each extending over at least one bag attachment.

5. The yard sweeping device of claim 4 including a plurality of rigid curved guards said guards attached to the backside of one of the side elements and extending over a plurality of bag attachments.

* * * * *